No. 776,471. PATENTED NOV. 29, 1904.
C. W. JACKSON.
PROCESS OF MAKING MUSH.
APPLICATION FILED DEC. 23, 1903.
NO MODEL.
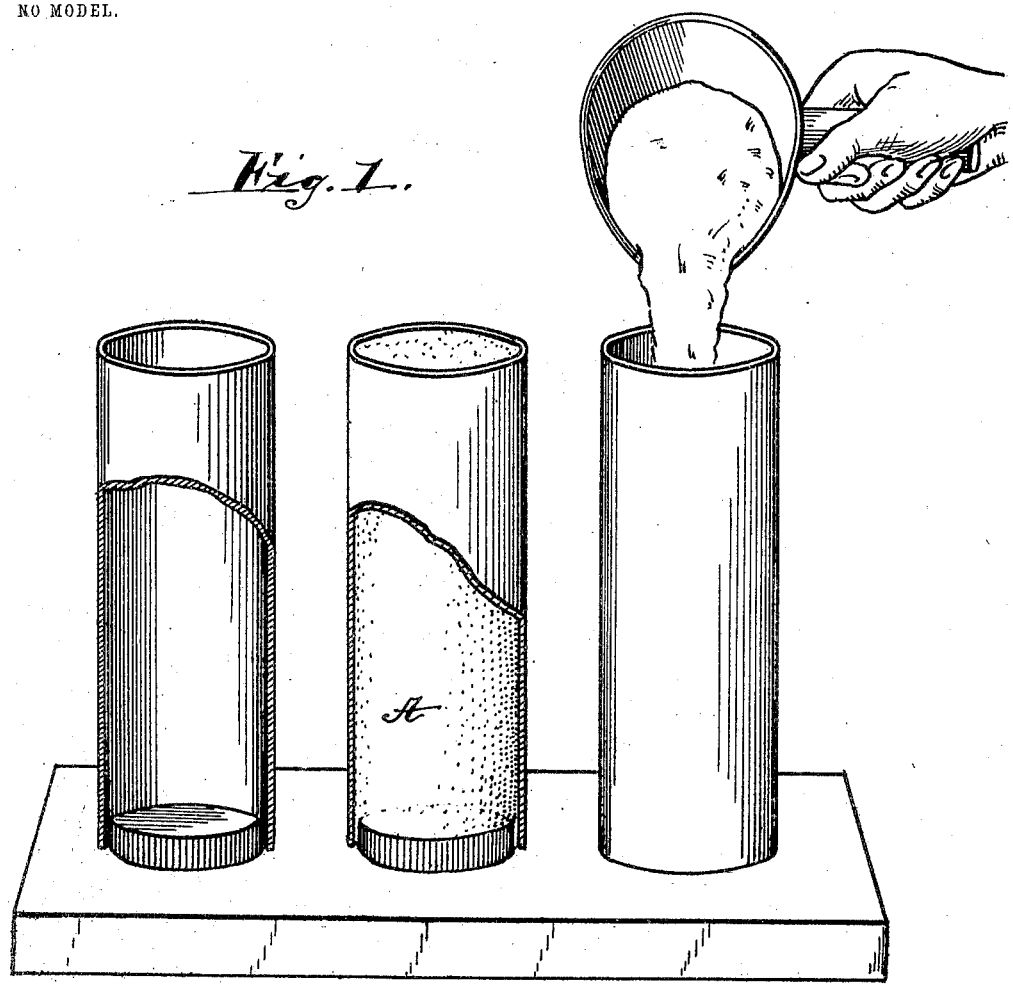
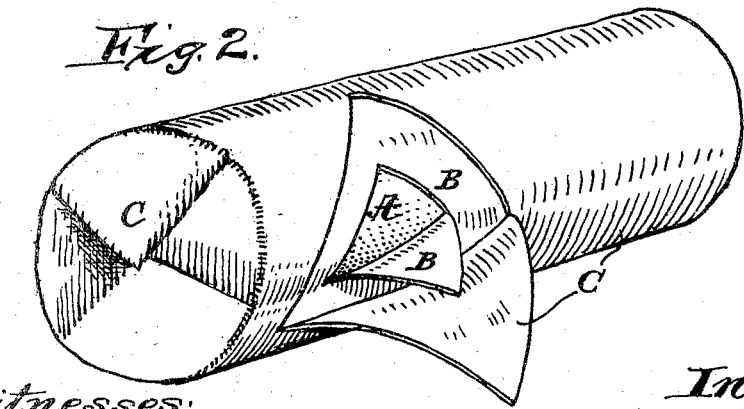

No. 776,471.

Patented November 29, 1904.

UNITED STATES PATENT OFFICE.

CYRUS W. JACKSON, OF INDIANAPOLIS, INDIANA, ASSIGNOR OF ONE-HALF TO JOSEPH A. MINTURN, OF INDIANAPOLIS, INDIANA.

PROCESS OF MAKING MUSH.

SPECIFICATION forming part of Letters Patent No. 776,471, dated November 29, 1904.

Application filed December 23, 1903. Serial No. 186,283. (No specimens.)

*To all whom it may concern:*

Be it known that I, CYRUS W. JACKSON, a citizen of the United States, residing at Indianapolis, in the county of Marion and State of Indiana, have invented certain new and useful Improvements in Processes of Making Mush in Merchantable Rolls, of which the following is a specification.

My invention relates to a certain new and useful process employed in the making of a cooked food out of cereals, of which the principal ingredients will be ground cornmeal or maize and water; and the invention has for its object, among others, the provision of a simple, inexpensive, and efficient process by which a more nutritious and palatable product than the well-known cornmeal mush is produced, the new product being formed into rolls by pouring into molds while hot and sufficiently fluid to pour readily and having the capacity of absorbing the excess of water while in the molds before cooling, so as to produce a drier, more tenacious, and elastic mush better adapted for handling in the course of trade and for slicing and frying than any mush produced by the old ways.

To these ends and to such others as the invention may pertain the same consists in the novel steps taken in carrying out my process, as will hereinafter be more particularly explained and then specifically defined in the appended claims.

Referring to the accompanying drawings, Figure 1 is a perspective view of a mold for which I jointly with Joseph A. Minturn have made separate application for patent. This view shows two of the molds broken away in part to show the interior thereof, the first being shown empty, the second filled with mush, and the third in the process of being filled; and Fig. 2 is a perspective view of a mush roll wrapped for market, the wrappers being torn through and turned back for clearer illustration.

In the old and well-known process of cooking mush the water is brought to a boil, and the meal, all of a uniform fineness, is gradually added. A mush thus prepared, which will pour readily into pans or molds, is too wet when cold to fry with any degree of satisfaction because the excess of water produces explosions which cause the mush and grease in the pan to pop and fly out in a disagreeable manner, to say the least, and the remaining mush disintegrates when warmed into a mussy mass, which cannot be browned and kept together as slices. By my new process the water is first heated to boiling and then the ground cereal in proportion of one part of the cereal, by weight, to from four to five parts of water, the exact proportion varying with different grades of meal and only ascertained by trial, is added. The cereal used will, as a general thing, be a corn product and will consist of meal and hominy-grits, the proportion of hominy-grits being from fifteen to thirty per centum, by either weight or measure, of the whole quantity of cereal used. The average proportion of grits will be twenty-two per centum; but this will vary with meal made from different grades of corn and must be determined by tests with the particular meal to be used. The hominy-grits are added first to the boiling water, and after that the cornmeal is added by degrees attended by constant stirring. Among other things this stirring keeps the grits moving through the mixture, and their greater size and weight as compared with the particles of meal break up the meal lumps and distribute the meal more uniformly through the mixture than would otherwise be possible. During the whole cooking process of approximately one half-hour from the first addition of cereal to the boiling water the mass of water and meal must be stirred unceasingly and the product kept from sticking to the bottom of the cooker to prevent scorching and to thoroughly blend and smooth the product. The finished mush is made as thick as possible consistent with pouring it readily, and when that condition is reached the fire is drawn or the vessel containing it is removed from the fire to prevent burning, and ten minutes after the last addition of meal is made the mush is ready to pour into molds. The hominy-grits, having been added to the water first, have been cooking longest, which owing to their size and hard horny nature is necessary; but at the point when the mush is poured into the molds the grits have not absorbed their full quota of water. The grits continue to absorb water after the mush has been poured into the molds, with the desired result that the excess of moisture which was beneficial in the pouring process, but is detrimental in the finished goods, is taken up by the harder or larger hominy-grits particles.

Rice and other cereals than maize in coarse particles may be used with cornmeal instead of the hominy-grits without departing from the spirit of this invention, and a substitution of wheat-flour for the cornmeal and the use of cornmeal with the flour in the place of hominy-grits makes a very palatable mush, which in some northern localities, where flour is cheaper than meal, is a preferable blend and the distinctive feature of my process—that of the presence of two cereal elements, one of which absorbs moisture more readily or faster than the other.

The reduction of mush into merchantable sizes or rolls by pouring it into molds of the desired capacity and allowing it to cool instead of subdividing a large body of mush by slicing is preferable because of the formation on cooling of a gelatinous coating, which in a large measure assists in holding the shape of the body. Also it helps to keep the inner portions moist and sweet and facilitates the removal of the cooled mush from the mold. The hominy-grits, being the nitrogenous, translucent, flinty, or horny portions of the grains of corn, furnishes the material, when it is cooked into mush as above described, for said gelatinous coat far in excess of that which obtains by the use of cornmeal alone, and because said grits are rich in albumenoids (flesh-forming materials) it adds to the bone and sinew building properties of the food at the expense of the heat-producing carbohydrates, (starch, sugar, &c.,) thereby providing a more hygienic nutriment. To this gelatinous coating which forms on the roll A, I add an additional protection by way of an inner wrapper B of paper made impervious to air and moisture by paraffin, oil, or other suitable coating and to this add an outer wrapper of paper C. The roll is then ready for the market.

The above wrappings of paper are necessary to retain the shape of the mush roll, and without the waterproof inner wrapper the moisture from a roll would saturate the outer cover, so as to destroy the commercial value of the goods.

In addition to the above benefits of manufacture and nutritive value the presence of the hominy-grits makes the mush more adherent, tenacious, and elastic for handling; also, makes it slice and fry more satisfactorily and adds to the flavor and relish to an extent that would be most desirable independently of the other considerations hereinbefore mentioned.

Having thus fully described my invention, what I claim as new, and wish to secure by Letters Patent, is—

1. The process of making mush from a plurality of cereal products of different grades of fineness, which comprises first adding the coarse grade to boiling water and then gradually adding the finer grade to the boiling water containing the coarser grade and cooking and mixing the mass until the finer-grade cereal is thoroughly cooked and said mass of a consistency to pour readily, then pouring the same into molds and allowing it to cool and the coarser particles to absorb sufficient of the moisture to render the mass of a harder consistency, substantially as set forth.

2. The process of making mush which consists in first adding coarse hominy-grits to the boiling water and afterward gradually mixing in with the boiling water and grits a cereal meal of much finer grade than said grits, and cooking and mixing the mass until said finer-grade meal is thoroughly cooked but the mass not too thick to pour readily, then pouring the same into molds and allowing it to remain until cooled and the coarser particles have absorbed the excess moisture and rendered the mass of the desired density and hardness, substantially as set forth.

3. The process of making mush which consists in first adding coarse hominy-grits to the boiling water and afterward gradually mixing in with the boiling water and grits a cereal meal of much finer grade than said grits, and cooking and mixing the mass until said finer-grade meal is thoroughly cooked but the mass not too thick to pour readily, then pouring the same into molds and allowing it to remain until cooled and the coarser particles have absorbed the excess moisture and rendered the mass of the desired density and hardness, the proportion of the different grades of cereal products being approximately twenty-two per cent. of the coarse and seventy-eight per cent. of the fine, substantially as set forth.

In witness whereof I have hereunto set my hand and seal, at Indianapolis, Indiana, this 19th day of December, A. D. 1903.

CYRUS W. JACKSON. [L. S.]

Witnesses:
 J. A. MINTURN,
 S. MALDEN UNGER.